US005771982A

United States Patent [19]

Briggs et al.

[11] Patent Number: 5,771,982

[45] Date of Patent: Jun. 30, 1998

[54] ROCK DRILL

[76] Inventors: Roger Robarts Briggs, 23 Leyes La., Kenilworth, Warickshire, CU8 20D, United Kingdom; Jarmo Uolevi Leppanen, c/o 11 Junction Road, Industries North, Germiston, 1401, South Africa

[21] Appl. No.: 535,282

[22] PCT Filed: Apr. 21, 1994

[86] PCT No.: PCT/GB94/00851

§ 371 Date: Oct. 19, 1995

§ 102(e) Date: Oct. 19, 1995

[87] PCT Pub. No.: WO94/24403

PCT Pub. Date: Oct. 27, 1994

[30] Foreign Application Priority Data

Apr. 21, 1993 [SA] Saudi Arabia .......................... 93/2778

[51] Int. Cl.[6] ...................................................... B23B 45/02

[52] U.S. Cl. ............................................ 173/104; 173/216

[58] Field of Search .............................. 173/48, 104, 105, 173/216, 217

[56] References Cited

U.S. PATENT DOCUMENTS

| | | | |
|---|---|---|---|
| 3,357,275 | 12/1967 | Green et al. . | |
| 3,406,763 | 10/1968 | Worman | 173/47 |
| 3,858,666 | 1/1975 | Bailey et al. . | |
| 4,576,240 | 3/1986 | Matsumoto | 173/105 |
| 4,593,768 | 6/1986 | Eklöf | 173/200 |
| 4,842,079 | 6/1989 | Heinonen | 173/105 |
| 4,842,080 | 6/1989 | Heinonen . | |
| 4,846,289 | 7/1989 | Heinonen | 173/162.1 |
| 4,854,394 | 8/1989 | Heinonen | 173/105 |
| 4,962,681 | 10/1990 | Yang . | |
| 5,060,734 | 10/1991 | Anderson et al. . | |
| 5,117,921 | 6/1992 | Bartels et al. | 173/13 |
| 5,415,240 | 5/1995 | Mundjar | 173/48 |
| 5,624,000 | 4/1997 | Miller | 173/216 |

FOREIGN PATENT DOCUMENTS

| | | |
|---|---|---|
| 0 408 987 A2 | 7/1990 | European Pat. Off. . |
| 87 2885 | 4/1987 | South Africa . |

*Primary Examiner*—Scott A. Smith
*Attorney, Agent, or Firm*—Barnes & Thornburg

[57] ABSTRACT

A rock drill which includes a main body with a chamber which is formed in the main body at a first end of the main body, and a rotation module which includes a gear housing, at least the gear housing being mounted in the chamber.

8 Claims, 2 Drawing Sheets

ROCK DRILL

BACKGROUND OF THE INVENTION

This invention relates to a rock drill and more particularly to the mounting of a rotation module to the body of a rock drill.

Rocks drills known to the applicant consist of various sections which are bolted together. These sections normally include at least a drill rod flushing section, a rotation gear housing section and a percussion section. The drill, assembled from the aforementioned parts, is bolted to a drill cradle Which slides on a drill feed during drilling.

This kind of arrangement simplifies the construction and lowers the cost of manufacture. On the other hand the rock drill is more vulnerable to damage and its life expectancy is reduced.

In percussive drilling a heavy drill piston hammers the drill steel via a drill shank at a frequency of from 40 to 60 Hz. The resulting vibrations can cause the connecting bolts to become loose and this in turn, without maintenance and tightening up, will result in heavy maintenance expenses or, at worse, ruin the drill.

Loose bolts also cause wear on opposing surfaces between adjacent sections. The worn surfaces or the loose sections cause the percussion section to move out of alignment with the drill shank. The impact surface between the piston and the shank may then be angled and this can cause the shank or the piston to break. If the piston breaks, the percussion mechanism, which is expensive, is invariable destroyed and the hydraulic oil is contaminated.

The applicants are aware of an arrangement for mounting a rotation element in a drilling machine, described in the specification of U.S. Pat. No. 4,842,080, wherein the rotation element has stepped bearing surfaces which permit the rotation element to be mounted to a body in a simplified manner. The rotation element may be detached from the body by removal of a single end cover. With this arrangement rotation machinery is mounted on an outer surface of the body and imparts a rotational drive via a gear ring to the rotation element. The advantage of having a separate rotation module is lost.

Similarly, in the specification of South African patent No. 87/2885 (counterpart to Finnish application No. 861938) there is disclosed a rotation bushing mounted directly inside the body of a drill. Again the advantage of a separate rotation module is lost.

SUMMARY OF THE INVENTION

The invention is concerned with a rock drill of relatively simplified construction which embodies important manufacturing and maintenance aspects.

The invention provides a percussive rock drill which includes a main body with a chamber which is formed in the main body, a rotation module which includes a gear housing which is mounted in the chamber, gear means in the gear housing, a drill shank which is engaged with the gear means and which is rotatable and reciprocable relatively to the gear housing, and a percussion module which is located in the main body, the rotation module being positioned at one end of the percussion module.

The gear housing may include a flange which is secured directly to one end of the body. Alternatively the flange may be dispensed with.

A flushing module may be located on an outer side of the rotation module and may be secured directly to the main body or indirectly, via the flange of the gear housing.

The rotation module may be engageable with drive means extending from at least one rotation motor which is mounted at a second end of the body which is remote from the end to which the aforementioned flange is secured.

Alternatively at least one rotation motor is mounted directly to the rotation module, for example to the flange of the gear housing.

BRIEF DESCRIPTION OF THE DRAWINGS

The invention is further described by way of example with reference to the accompanying drawings in which.

DESCRIPTION OF PREFERRED EMBODIMENT

Figure 1:
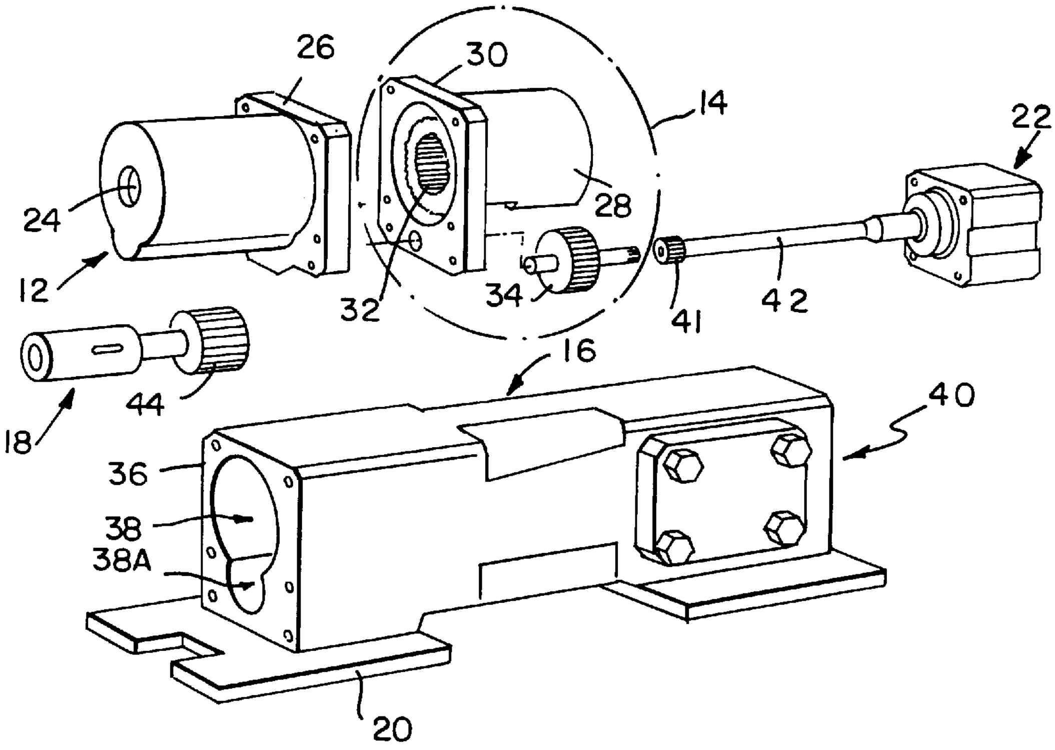
FIG. 1 is a view in perspective of a rock drill according to one form of the invention with modules of the rock drill shown in an exploded configuration.
Figure 2:
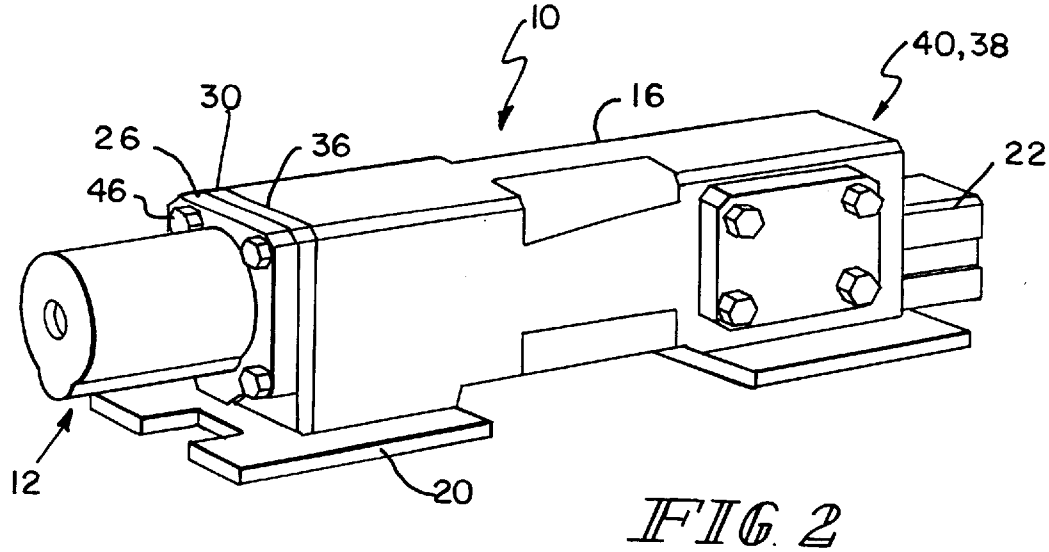
FIG. 2 is a perspective view illustrating the rock drill of FIG. 1 fully assembled.
Figure 3:
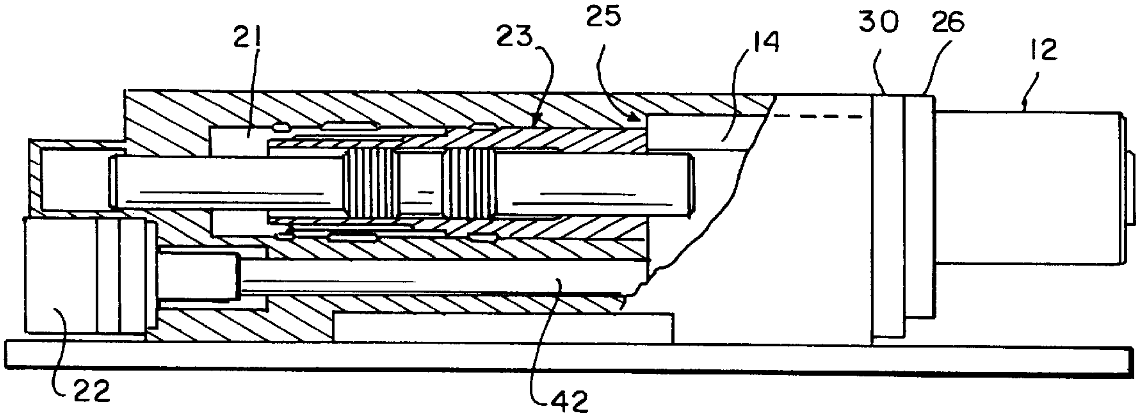
FIG. 3 is a rear side view, partly, sectioned of the assembled rock drill.

FIGS. 1, 2 and 3 of the accompanying drawings illustrate a rock drill 10 according to the invention which includes a flushing module 12, a rotation module 14, a main body 16, a shank 18, a cradle 20, a rotation motor 22 and a percussion cartridge or module 23.

The flushing module 12 is of substantially conventional construction and includes a passage 24 which extends through the module, and a mounting flange 26.

The rotation module 14 includes a gear housing 28 and a mounting flange 30. Rotationally mounted to the housing 28 are a gear mechanism 32, and a drive gear 34 which is meshed with the gear mechanism 32.

The main body 16 has an inner chamber 21 which houses the percussion cartridge or module 23. The main body is elongate and at a first end 36 is formed with chambers 38 and 38A. At a second end 40, which is remote from the first end, the body is adapted to receive the rotation motor 22. One end 25 of the module 14 directly abuts an opposing end of the module 23 closing the chamber 21 and retaining the module 23 in position.

A shaft 42 extends from the motor 22. The drive gear or pinion 34 of the rotation module is connected to the shaft 42 in any suitable way, for example by means of a spline connection 41. This is not limiting and any appropriate means of connecting the shaft to the pinions may be used.

The shank 18 includes a pinion 44 to transfer rotational movement from the gear mechanism 32.

FIGS. 2 and 3 illustrate the rock drill fully assembled. The rotation motor 22 is bolted to the second end 40 of the main body 16. The shaft 42 extends through the body and the pinion 34, attached to the rotation module 14, is located in the lower chamber 38A shown in FIG. 1, meshing with the gear mechanism 32.

The rotation module 14 is secured to the body 16 by locating the housing 28 and the pinion 34 inside the chambers 38 and 38A. The flange 30 sits against the first end 36 of the body. The housing 28 is fully encapsulated in the chamber 38.

The pinion 44 of the shank 18 is meshed with the gear mechanism 32 and the shank 18 is located in the passage 24. The flange 26 of the flushing module mates with the flange 30 and the flushing module and the rotation module are secured to the body 16 by means of bolts 46.

The rock drill of the invention has the advantage that the gear housing is separate and replaceable and is well guided and supported by and locked to the main body 16. Vibrations and radial and axial forces which are exerted on the gear housing during drilling, from the drill shank 18, are thus dampened by the main body. The possibility of the gear housing becoming loose and misalignment with the main body 16 is thus reduced. Misalignment will cause unlevelled percussion surfaces between the reciprocating piston and the drill shank 18, over stressing all the components on the rock drill, and particularly along the percussive drilling piston, its bearings and the drill shank 18.

It is to be noted that the gear housing is not connected to the drill cradle 20. The length of the body 16 can be maximized to improve the connection of the body 16 to the cradle and to reduce vibrations which are exerted on the percussion section in the body 16. Thus the vibrations, forces and shock loading which arise during use are taken up mainly by the solid heavy main body 16.

The housing 28 of the rotation module 14 can be made without the flange 30 in which event the module, once located in the chambers 38 and 38A, is kept in position by the reaction forces which arise between the housing 28 and the main body 16 and by the flange 26 which is bolted directly to the body 16. This modification reduces to one the number of mating surfaces in the assembled rock drill.

Figure 4:
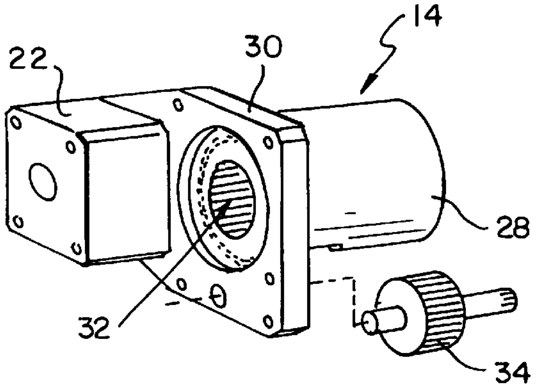
FIG. 4 shows a modified rotation module and rotation motor construction.

Another possible variation is shown in FIG. 4 which depicts the rotation module 14 with an extended flange 30 which is adapted to receive the rotation motor 22 which is directly fixed to the flange. Rotational movement from the rotation motor 22 is transferred to the gear mechanism 32 by means off the drive gear 34. The drive gear 34 is located on the rear side of the flange 30 (see FIG. 4), is connected to the motor 22, and meshes directly with the gear mechanism 32.

We claim:

1. A percussion rock drill which includes a main body with a chamber which is formed in the main body, a rotation module which includes a gear housing which is mounted in the chamber, gear means in the gear housing, a drill shank which is engaged with the gear means and which is rotatable and reciprocable relatively to the gear housing, and a percussion module which is located in the main body, the rotation module being positioned at one end of the percussion module.

2. A rock drill according to claim 1 wherein at least the gear housing is totally encapsulated in the chamber.

3. A rock drill according to claim 1 wherein the gear housing includes a flange which is secured directly to the main body.

4. A rock drill according to claim 1 which includes at least one rotation motor mounted to the main body, the rotation module being engaged with drive means extending from the at least one rotation motor.

5. A rock drill according to claim 1 which includes at least one rotation motor which is mounted directly to the rotation module.

6. A rock drill according to claim 1 which includes a flushing module which is located on an outer side of the rotation module.

7. A rock drill according to claim 1 which includes a cradle to which the main body is fixed.

8. A rock drill according to claim 1 wherein the rotation module is mounted with a first side of the rotation module on one side of the percussion module, and which includes a flushing module which is mounted on a second side of the rotation module, and at least one rotation motor for driving the gear means.

* * * * *